United States Patent [19]
Di Carlo

[11] 3,862,071
[45] Jan. 21, 1973

[54] AQUEOUS THERMOSETTING ACRYLIC ENAMEL CONTAINING METALLIC FLAKE PIGMENT
[75] Inventor: James Di Carlo, Philadelphia, Pa.
[73] Assignee: E. I. duPont deNemours and Company, Wilmington, Del. 19898
[22] Filed: May 15, 1973
[21] Appl. No.: 360,583

[52] U.S. Cl..... 260/29.4 UA, 260/39 M, 260/42.22, 260/856
[51] Int. Cl............................................. C08g 51/24
[58] Field of Search............ 260/29.4 UA, 851, 856, 260/39 M, 42.22

[56] References Cited
UNITED STATES PATENTS

| | | | |
|---|---|---|---|
| 3,218,280 | 11/1965 | Koral, et al. | 260/29.4 UA |
| 3,403,088 | 9/1968 | Hart | 260/29.4 UA |
| 3,503,918 | 3/1970 | LeSota, et al. | 260/29.4 UA |
| 3,674,734 | 7/1972 | Parker | 260/855 |
| 3,766,156 | 10/1973 | Kine, et al. | 260/851 |

Primary Examiner—Lorenzo B. Hayes

[57] ABSTRACT

The aqueous thermosetting acrylic coating composition contains 0.25–1% by weight of uniformly dispersed metallic flake pigments and has the following film-forming constituents:

1. an acrylic polymer of styrene and/or methyl methacrylate, an alkyl acrylate or an alkyl methacrylate other than methyl methacrylate, a hydroxy alkyl acrylate or a hydroxy alkyl methacrylate and an $\alpha,\beta$-unsaturated carboxylic acid wherein the polymer has an acid number of 35–150 and a carboxyl/hydroxyl ratio of 1:0.2 to 1:1.8; and
2. a water-soluble or water-dispersible alkylated melamine formaldehyde resin;

the improvement used with this coating composition comprises 0.5–5% by weight, based on the weight of the film-forming constituents, of an acrylic copolymer of 75–95% by weight of an alkyl acrylate having 1–8 carbon atoms in the alkyl group and 5–25% by weight of acrylic acid or methacrylic acid and has a weight average molecular weight of 2,500 to 45,000;

the novel coating composition is useful as an exterior finish for automobile and truck bodies.

7 Claims, No Drawings

AQUEOUS THERMOSETTING ACRYLIC ENAMEL CONTAINING METALLIC FLAKE PIGMENT

BACKGROUND OF THE INVENTION

This invention relates to an aqueous based coating composition and in particular to an improved aqueous thermosetting acrylic enamel pigmented with metallic flake pigments that provides a high quality finish for the exterior of automobile and truck bodies.

Water based enamel finishes containing metallic flake pigments form high quality finishes for the exterior of automobile and truck bodies. However, a noticeable mottled appearance of these finishes upon drying has been noted making the finishes unacceptable for the above use. Conventional techniques to reduce the mottling of this finish have not been successful. The improved coating of this invention provides a nonmottled metallic finish that has an excellent appearance and which is useful as an exterior finish for automobile and truck bodies.

SUMMARY OF THE INVENTION

In an aqueous thermosetting acrylic enamel coating composition that comprises 10–60% by weight of film-forming constituents and correspondingly 89.75–39% by weight of water and up to 20% by weight of a solvent for the film-forming constituents and 0.25–1% by weight of a uniformly dispersed metallic flake pigment; wherein the film-forming constituents consist essentially of
1. 59.5–85% by weight, based on the weight of the film-forming constituents, of an acrylic polymer having a uniformity factor of at least 75% which consists essentially of
   a. 20–60% by weight, based on the weight of the acrylic polymer, of a hard constituent which is either methyl methacrylate, or a blend of methyl methacrylate and styrene wherein the styrene comprises up to 40% by weight of the acrylic polymer;
   b. 20–40% by weight, based on the weight of the acrylic polymer, of a soft acrylic constituent that is either an alkyl acrylate having 2–12 carbon atoms in the alkyl group, an alkyl methacrylate having 4–12 carbon atoms in the alkyl group, or a mixture of the above alkyl acrylate and alkyl methacrylate;
   c. 4–20% by weight, based on the weight of the acrylic polymer, of a hydroxy-containing constituent which is either a hydroxyalkyl methacrylate or a hydroxyalkyl acrylate or a mixture thereof in which the alkyl groups have 2–4 carbon atoms.
   d. 4–20% by weight, based on the weight of the acrylic polymer, of $\alpha,\beta$-unsaturated carboxylic acid;
   wherein the polymer has a carboxyl to hydroxyl ratio of 1:0.2 to 1:1.8 and an acid number of about 35–150 and a weight average molecular weight of 5,000–80,000; and
2. 10–40% by weight, based on the weight of the film-forming constituent, of a water dispersible or water soluble cross-linking resin, preferably, an alkylated melamine formaldehyde resin having 1–4 carbon atoms in the alkyl group; and the composition is at least partially neutralized with a water-soluble amine and has a pH of about 6–9; the improvement used with this coating composition comprises 0.5–5% by weight, based on the weight of the film-forming constituents, of an acrylic copolymer consisting essentially of
  75–95% by weight, based on the weight of the copolymer, of an alkyl acrylate having 1–8 carbon atoms in the alkyl group and
  5–25% by weight, based on the weight of the copolymer, of acrylic acid or methacrylic acid;
wherein the copolymer has a weight average molecular weight of about 2,500 to 45,000.

DESCRIPTION OF THE INVENTION

The novel coating composition of this invention has a solids content of film-forming constituents of about 10–60% by weight and preferably about 20–50% by weight. The novel composition contains about 0.25–1% by weight of metallic flake pigments. Preferably, aluminum flake pigments are used.

The film-forming constituents of the novel coating composition comprise 59.5–85% by weight of acrylic polymer, 40–10% by weight of a water dispersible or water soluble cross-linking resin with the improvement to the composition being 0.5–5% by weight of an acrylic copolymer. Preferably, an alkylated melamine formaldehyde resin that is compatible with the acrylic polymer is used. Preferably, the novel composition contains 64.5–85% of the acrylic resin, 35–10% by weight of an alkylated malamine formaldehyde resin and 0.5–5% by weight of an acrylic copolymer of butylacrylate and acrylic acid.

The acrylic copolymer used in the novel composition of this invention provides the improved nonmottling properties to the composition. The acrylic copolymer is prepared by conventional polymerization techniques in which the monomers, solvents and polymerization catalyst are charged into a reaction vessel and heated to a polymerization temperature of about 75°–125°C. for about 1–4 hours to form a copolymer having a weight average molecular weight of about 2,500 to 45,000 and preferably 2,500 to 12,000. These molecular weights are determined by gel permeation chromatography using polymethyl methacrylate as the standard.

The acrylic copolymer contains 75–95% by weight of an alkyl acrylate that has 1–8 carbon atoms in the alkyl group and 5–25% by weight of acrylic acid or methacrylic acid. Typical alkyl acrylates that are used to prepare the acrylic copolymer are methyl acrylate, ethyl acrylate, propyl acrylate, isopropyl acrylate, butyl acrylate, hexyl acrylate, 2 ethylhexyl acrylate, octyl acrylate, and the like. Preferably the acrylic copolymer consists of 75–95% by weight of butyl acrylate and 5–25% by weight of acrylic acid. One preferred acrylic copolymer consists of 85% butyl acrylate and 15% acrylic acid.

The acrylic polymer used in the novel coating composition of this invention is partially soluble and partially dispersed in the aqueous medium. About 30–50% by weight of the acrylic polymer is dispersed and has a particle size of about 0.01–0.10 microns preferably about 0.02–0.06 microns and the residual 50–70% by weight of the acrylic polymer is soluble and dissolved in the aqueous medium. To obtain water solubility and dispersibility the acrylic polymer has a carboxyl to hydroxyl ratio of 1:0.2 to 1:1.8 which is the molar ratio of carboxyl groups to hydroxyl groups of the polymer.

The acrylic polymer used in the novel coating composition of this invention has a uniformity factor of at least 75% and preferably 80–95%. The uniformity factor is the per cent of the polymer in which the constituents are within plus or minus 15% of the average amount given for the polymer. For example, if the average composition of the acrylic polymer is 54% methyl methacrylate, 34% butyl acrylate, 6% 2-hydroxyethyl acrylate and 6% acrylic acid; 75% of the polymer will be within plus or minus 15% of these average values or 54 ± 8% methyl methacrylate, 34 ± 5% butyl acrylate, 6 ± 0.9% 2-hydroxyethyl acrylate, and 6 ± 0.9% acrylic acid.

The acrylic polymer utilized in the novel composition of this invention is prepared by a programmed addition of the monomers, polymerization catalysts and solvents. This programmed addition process is an attempt to form polymer at all stages of the polymerization process which is essentially the same as the predetermined composition, and results in a polymer composition upon completion of the process which has a uniformity factor of at least 75%. This process allows for high percentage conversion of monomers to polymer and also provides a polymer having a relatively uniform molecular weight. These polymers when used in the novel composition of this invention provide high quality finishes.

Conventional polymerization processes, such as batch polymerization, commonly used in the art provide polymers with a wide range of compositions and molecular weights which are not suitable for the novel coating composition of this invention.

The above programmed addition polymerization process is based on a computer program which uses known polymerization equations and activity ratios of monomers to determine the monomer addition rates and ratios and polymer polymerization temperatures and times. This forms a polymer that has a uniform composition throughout. The above programmed addition procedure can be based on a computer program which uses a polymerization equation in which the polymerization values of the monomers are used. In general, the programmed polymerization procedure comprises an initial charge of monomers and solvents which are heated to the reflux temperature in the polymerization vessel, then at given intervals monomers and polymerization initiator are charged into the vessel while maintaining a reflux temperature according to the programmed polymerization procedure. Throughout the polymerization reaction, the polymer being formed has a uniformity factor of at least 75%. In general, the polymerization is conducted at about 75°–125°C. over a 2–4 hour period to form a polymer that has a weight average molecular weight of about 5,000–80,000, and preferably, about 10,000–50,000 determined by gel permeation chromatography. The polymer has an acid number of about 35–150, preferably about 35–80.

In one preferred process which prepares a polymer of 52–56% by weight methyl methacrylate, 32–36% by weight butyl acrylate, 5–7% by weight of hydroxyethyl acrylate and 5–7% by weight of acrylic acid, the constituents are reacted as follows:

Step 1.

The following constituents are charged into a reaction vessel and are heated to reflux temperature:

13–15% by weight of the total amount of methyl methacrylate,
52–54% by weight of the total amount of butyl acrylate,
28–30% by weight of the total amount of hydroxy ethyl acrylate,
23–25% by weight of the total amount of acrylic acid,
water miscible solvents such as isopropanol and ethylene glycol monobutyl ether and a chain transfer agent such as lauryl mercaptan.

Step 2.

The following ingredients are then charged into the reaction vessel:

polymerization catalyst such as benzoyl peroxide and optionally,
14–16% by weight of the total amount of methyl methacrylate,
the addition of the methyl methacrylate in this step is optional since this amount of methyl methacrylate may be added in the first step and a solvent may be used for the benzoyl peroxide.

Step 3.

The following ingredients are then slowly and continuously charged into the reaction vessel over a 14–16 minute period.

20–21% of the total amount of methyl methacrylate,
13–15% of the total amount of butyl acrylate,
31–33% of the total amount of hydroxy ethyl acrylate,
22–24% of the total amount of acrylic acid, and polymerization initiator of benzoyl peroxide.

Step 4.

The following ingredients are then slowly and continuously charged into the reaction vessel over a 49–51 minute period while maintaining the reaction mixture at a reflux temperature, 31–33% of the total amount of methyl methacrylate,
20–22% of the total amount of butyl acrylate,
31–33% of the total amount of hydroxy ethyl acrylate,
33–35% of the total amount of acrylic acid, and polymerization initiator of benzoyl peroxide.

Step 5.

The following ingredients are then slowly and continuously charged into the reaction vessel over a 75–80 minute period:

17–19% of the total amount of methyl methacrylate,
11–13% of the total amount of butyl acrylate,
17–19% of the total amount of hydroxyethyl acrylate
17–19% of the total amount of acrylic acid
and polymerization initiator of benzoyl peroxide;
the reaction mixture is held at reflux temperature for about 25–35 minutes to form a polymer.

Step 6.

The polymer is then neutralized with an amine and then diluted with water to form a dispersion.

Water miscible solvents are used in the polymerization process such as isopropanol n-propyl alcohol, diacetone alcohol and other alcohols, acetone, acetyl acetone, ethylene glycol monoethyl ether, ethylene glycol monobutyl ether and ethylene glycol monomethyl ether acetate. Minor amounts of solvents of limited water solubility can be used such as methyl ethyl ketone, ethylene glycol monoethyl ether acetate. The novel composition can contain up to about 20% by weight of water miscible solvent but preferably contains 5–15% by weight of solvent.

About 0.1–4% by weight, based on the weight of the monomer used to prepare the acrylic polymer, of the polymerization catalyst is utilized. Typical catalysts are azo-bisisobutyronitrile, azo-bis-($\alpha,\gamma$-dimethylvaleronitrile), benzoyl peroxide, t-butyl peroxypivalate, t-butyl peracetate and the like. Chain transfer agents such as lauryl mercaptan are also used.

The acrylic polymer contains 20–60% by weight of a hard constituent which can be methyl methacrylate or a mixture of methyl methacrylate and styrene; up to 40% by weight of the polymer can be styrene. The acrylic polymer can contain 5 to 30% by weight of styrene in combination with 15 to 30% by weight of methyl methacrylate. Preferably, the polymer contains about 52–57% by weight of methyl methacrylate.

The acrylic polymer contains 20–40% by weight of a soft acrylic constituent which is either an alkyl acrylate that has 2–12 carbon atoms in the alkyl group, an alkyl methacrylate having 4–12 carbon atoms in the alkyl group or a mixture of these two constituents. Preferably, the acrylic polymer contains 28 to 38% by weight of the soft acrylic constituent, preferably, an alkyl acrylate having 2–8 carbon atoms in the alkyl group. The following are typical soft acrylic monomers which can be utilized: ethyl acrylate, propyl acrylate, isopropyl acrylate, butyl acrylate, isobutyl acrylate, hexyl acrylate, 2-ethylhexyl acrylate, octyl acrylate, nonyl acrylate, lauryl acrylate and the like, butyl methacrylate, isobutyl methacrylate, pentyl methacrylate, hexyl methacrylate, octyl methacrylate, 2-ethylhexyl methacrylate, decyl methacrylate, lauryl methacrylate and the like. Butyl acrylate is the preferred soft acrylic constituent since it forms a high quality polymer that has excellent physical properties.

The acrylic polymer contains 4–20% by weight of a hydroxy containing constituent such as a hydroxy alkyl acrylate or a hydroxy alkyl methacrylate or a mixture of these two compounds. Preferably, the polymer contains about 5–10% of the hydroxyl containing constituent. These constituents contain 2–4 carbon atoms in the alkyl groups and are, for example, hydroxyethyl acrylate, hydroxybutyl acrylate, hydroxyethyl methacrylate, hydroxypropyl methacrylate, and hydroxybutyl methacrylate.

The acrylic polymer also contains 4–20% by weight, based on the weight of the acrylic polymer, of an $\alpha,\beta$-unsaturated carboxylic acid. Typically useful acids are acrylic acid, methacrylic acid, crotonic acid, itaconic acid, propyl acrylic acid, and the like. Preferably, acrylic acid and methacrylic acid are used in amounts of 4–10% by weight since these acids form high quality polymers useful in the novel composition of this invention.

One preferred acrylic polymer used in the novel coating composition of this invention contains 50–60% by weight of methyl methacrylate, 30–40% by weight of a soft acrylic constituent, preferably butyl acrylate, 5–10% by weight of the hydroxy containing constituent, preferably hydroxyethyl acrylate or hydroxypropyl methacrylate, and 4–12% by weight of acrylic acid, methacrylic acid, or itaconic acid. These preferred acrylic polymers have a weight average molecular weight of about 20,000–50,000, an acid number of about 35–100 and a carboxyl to hydroxyl ratio of about 1:1.03 to 1:1.5.

Another particularly useful acrylic polymer which gives a high quality finish contains about 28–32% by weight of styrene, 22–26% by weight of methyl methacrylate, 30–35% by weight of butyl acrylate, 7–9% by weight of hydroxy ethyl acrylate and 4–6% by weight of acrylic acid and has an acid number of about 30 to 50, a carboxyl to hydroxyl ratio of 1:0.4 to 1:1.5 and a weight average molecular weight of about 20,000–50,000.

To form the aqueous dispersion, the acrylic polymer is at least partially neutralized with a water-soluble amine and then dispersed in water. Typical water soluble amines that can be used are primary amines, secondary amines, tertiary amines, polyamines and hydroxyamines, such as ethanolamine, diethanolamine, triethanolamine, n-methylethanol amine, N,N-diethylethanolamine, N-aminoethanolamine, N-methyldiethanolamine, monoisopropanolamine, diisopropanolamine, triisopropanolamine, hydroxyamine, butanolamine, hexanolamine, methyl diethanolamine, N,N-diethylaminoethylamine, ethylene diamine, diethylene triamine, diethylene tetramine, hexamethylene tetramine, triethylamine and the like. The acrylic polymer is usually 50–60% neutralized and can be 100% neutralized. Neutralization of 50–60% is preferred since this degree of neutralization forms an aqueous dispersion which permits enamel formulation at high solids. The pH of the resulting aqueous coating composition is generally adjusted to a pH of 6–9, preferably 7.1–7.5.

The novel coating composition of this invention contains 10–40% by weight, based on the weight of the film-forming constituents, of a water dispersible or water soluble cross-linking resin. Preferably, alkylated melamine formaldehyde resins are used in an amount of about 20–40% by weight of this resin. The alkylated melamine formaldehyde resin has 1–4 carbon atoms in the alkyl group and is prepared by conventional techniques in which an alcohol such as methanol, ethanol, propanol, isopropanol or butanol is reacted with melamine formaldehyde resin. One preferred resin is hexamethoxymethyl melamine. Melamine formaldehyde resin reacted with isopropanol is another useful resin. Urea formaldehyde resins can also be used as a cross-linking resin.

Generally the novel coating composition of this invention contains pigments other than the metallic flake pigments in amounts of 0.1–40% by weight. A wide variety of pigments can be used such as metallic oxides, for example, titanium dioxide, iron oxide, zinc oxide, and the like, metal hydroxides, metal powders, chromates, sulfates, carbonates, carbon black, silica, talc, phthalocyanine blues and greens, indolinone pigments and other organic pigments and dyes.

The novel coating composition of this invention can be applied to a variety of substrates such as glass, plastics, metal and the like, by any of the usual application methods such as spraying, electrostatic spraying, dipping, brushing, flow coating and the like. These coatings are baked according to conventional procedures. One preferred baking cycle comprises a prebake at about 75°–95°C. for about 5–30 minutes and then a bake at about 125°–200°C. to provide a high quality nonmottling finish. The resulting finish is about 0.5–3.5 mils thick, preferably 1–2.5 mils in thickness, and can be rubbed or polished in accordance with conventional techniques to improve smoothness or gloss or both.

The novel coating composition of this invention is preferably applied over a primed metal substrate. Typical alkyd primers and epoxy primers pigmented with iron oxide, carbon black, titanium dioxide can be used. The primer can be applied by electrodeposition or can be applied by conventional spraying or dipping of the metal substrate. Also, the novel composition can be used directly over galvanized steel to form a durable coating.

The novel composition of this invention can be applied directly over a primed metal substrate without the use of an intermediate sealer coat. However, a sealer coat can be used to provide a finish with excellent adhesion and smoothness. These sealers may be water based or solvent based. One typically useful sealer composition is disclosed in Rohrbacher U.S. Pat. No. 3,509,086, issued Apr. 28, 1970.

The finish of the novel coating composition of this invention is characterized by a nonmottled appearance and is glossy and smooth and has water spot resistance, excellent craze resistance, good durability and weatherability and gloss retention and has good gasoline resistance. These characteristics make the novel composition particularly attractive as an exterior finish for automobiles and trucks.

The following Examples illustrate the invention. The parts and percentages are by weight unless otherwise specified.

EXAMPLE 1

A coating composition is prepared by first forming the following acrylic polymer:

|  | Parts By Weight |
|---|---|
| Portion 1 | |
| Methyl methacrylate monomer | 17.080 |
| Butyl acrylate monomer | 19.130 |
| 2-Ethyl hexyl acrylate monomer | 2.720 |
| Acrylic acid monomer | 1.150 |
| Isopropanol | 6.140 |
| Ethylene glycol monobutyl ether | 9.680 |
| Lauryl mercaptan | 0.294 |
| Portion 2 | |
| Benzoyl peroxide | 0.672 |
| Methylethyl ketone | 1.580 |
| Ethylene glycol monomethyl ether acetate | 1.580 |
| Ethylene glycol monobutyl ether | 2.360 |
| Portion 3 | |
| Methyl methacrylate monomer | 24.530 |
| Butyl acrylate monomer | 11.520 |
| 2-Hydroxyethyl acrylate | 3.910 |
| Acrylic acid | 2.090 |
| Benzoyl peroxide | 0.906 |
| Isopropyl alcohol | 3.000 |
| Ethylene glycol monobutyl ether | 9.800 |
| Portion 4 | |
| Methyl methacrylate monomer | 25.720 |
| Butyl acrylate | 12.080 |
| 2-Hydroxyethyl acrylate monomer | 4.090 |
| Acrylic acid monomer | 2.200 |
| Benzoyl peroxide | 1.248 |
| Isopropanol | 4.120 |
| Ethylene glycol monobutyl ether | 13.150 |
| Portion 5 | |
| Ethyl methacrylate | 9.570 |
| Butyl acrylate | 4.490 |
| 2-Hydroxyethyl acrylate | 1.520 |
| Acrylic acid monomer | 0.820 |
| Benzoyl peroxide | 0.440 |
| Isopropanol | 1.460 |
| Ethylene glycol monobutyl ether | 4.760 |
| Portion 6 | |
| Diethylethanolamine | 7.900 |
| Demineralized water | 101.300 |
| Portion 7 | |
| Demineralized water | 169.090 |
| Total | 492.100 |

Portion 1 is charged into a reaction vessel equipped with a stirrer, a heating mantel, and a reflux condenser and then heated to the reflux temperature which is about 160°C. Portion 2 is premixed and then added and then Portion 3 is premixed and added at a uniform rate over a 20 minute period, while maintaining the reaction mixture at its reflux temperature. Portion 4 is premixed and added at a uniform rate over a 60-minute period while the reaction mixture is maintained at its reflux temperature. Portion 5 is premixed and added at a uniform rate over a 100-minute period, then the reaction mixture is maintained at its reflux temperature for an additional ½ hour. Portion 6 is premixed and then added to the reaction mixture and then Portion 7 is added to the reaction mixture and the reaction mixture is cooled to room temperature and filtered to remove any coagulum.

The resulting polymer dispersion has a 34% polymer solids content in which the particle size is about 0.02–0.06 microns. The polymer has a relative viscosity of 1.16 measured at 25°C. in dimethyl formamide at about 0.5% polymer solids and has an acid number of about 33 to 35 and a carboxyl to hydroxyl ratio of 1 to 1.5. The polymer has the following composition: methyl methacrylate/butyl acrylate/2-hydroxyethyl acrylate/acrylic acid in a weight ratio of about 54.2/33.1/8.4/4.3 and uniformity factor of about 75–85%.

A phthalocyanine blue mill base is prepared as follows:

|  | Parts By Weight |
|---|---|
| Portion 1 | |
| Hexa(methoxymethyl) melamine | 546 |
| Isopropanol | 630 |
| Portion 2 | |
| Phthalocyanine blue pigment | 210 |
| Portion 3 | |
| Hexa(methoxymethyl) melamine | 285 |
| Isopropanol | 426 |
| Total | 2097 |

Portion 1 is mixed with Portion 2 over a 30 minute period and then Portion 3 is added and the constituents are mixed for 30 minutes. The resulting composition is passed through a standard sand mill and ground two passes to provide a uniform mill base.

A blue mill base is prepared as follows:

|  | Parts By Weight |
|---|---|
| Portion 1 | |
| Hexa(methoxymethyl) melamine | 78 |
| Isopropanol | 90 |
| Portion 2 | |
| "Monastral" blue pigment | 30 |
| Portion 3 | |
| Hexa(methoxymethyl) melamine | 41 |
| Isopropanol | 61 |
| Total | 300 |

Portion 1 is mixed with Portion 2 over a 30-minute period and then Portion 3 is added and the constituents are mixed for 30 minutes. The resulting composition is passed through a standard sand-mill and ground for two passes to provide a uniform blue mill base.

A violet mill base is prepared as follows:

|  | Parts By Weight |
|---|---|
| Portion 1 |  |
| Hexa(methoxymethyl) melamine | 13.6 |
| Isopropanol | 45.1 |
| Portion 2 |  |
| "Monastral" violet pigment | 7.0 |
| Portion 3 |  |
| Hexa(methoxymethyl) melamine | 7.6 |
| Isopropanol | 26.7 |
| Total | 100.0 |

Portions 1 and 2 are blended together and then mixed for 30 minutes and then Portion 3 is added and the composition is mixed for an additional 15 minutes. The resulting composition is then ground two passes in a standard sand-grinding mill to form a uniform mill base.

A green-yellow mill base is formed as follows:

|  | Parts By Weight |
|---|---|
| Portion 1 |  |
| Hexa(methoxymethyl) melamine | 78 |
| Isopropanol | 90 |
| Portion 2 |  |
| Phthalocyanine green-yellow pigment | 30 |
| Portion 3 |  |
| Hexa(methoxymethyl) melamine | 41 |
| Isopropanol | 61 |
| Total | 300 |

Portion 1 is blended with Portion 2 in a mixing vessel for 30 minutes and then Portion 3 is added and blended to an additional 15 minutes. The resulting composition is then ground two passes in a standard sand-grinding mill to form a uniform mill base.

An aluminum flake dispersion is prepared as follows:

|  | Parts By Weight |
|---|---|
| Aluminum flake | 1.71 |
| Hexa(methoxymethyl) melamine | 5.75 |
| Isopropanol | 11.05 |
| Total | 18.51 |

The above constituents are thoroughly blended together for 30 minutes to form a uniform dispersion.

A paint composition is prepared by blending together the following ingredients:

|  | Parts By Weight |
|---|---|
| Portion 1 |  |
| Phthalocyanine Blue mill base (prepared above) | 6.35 |
| Blue mill base (prepared above) | 0.20 |
| Violet mill base (prepared above) | 0.70 |
| Phthalocyano green-yellow mill base (prepared above) | 0.45 |
| Aluminum flake mill base (prepared above) | 11.05 |
| Portion 2 |  |
| Hexa(methoxymethyl) melamine | 20.40 |
| Portion 3 |  |
| Acrylic polymer dispersion (prepared above) | 272.40 |
| Portion 4 |  |
| Deionized water | 18.00 |

-Continued

|  | Parts By Weight |
|---|---|
| Portion 5 |  |
| Butyl acrylate/acrylic acid copolymer solution-(80% polymer solids in alcohol of an 85/15 butyl acrylate/acrylic acid copolymer having a weight average molecular weight of about 3200) | 3.30 |
| Silicone anti-cratering agent solution (10% low molecular weight silicone resin in water) | 3.35 |
| Deionized water | 31.00 |
| Total | 367.10 |

Portion 1 is charged in a mixing vessel and thoroughly blended together and then Portion 2 is added then blended with Portion 1 and Portions 3, 4 and 5 are added consecutively with blending after each addition. The resulting composition has a 30 second viscosity using a No. 2 Fisher cup and a total solids content of 28.1%.

A standard suction gun is used to apply the paint composition at an air pressure of about 80 pounds. The composition is applied to a steel panel primed with 1.5 mil thick iron oxide pigmented alkyd resin primer. Six passes are used to apply the paint and the panel is pre-baked for 15 minutes at 90°C. and then baked for 30 minutes at 150°C.

The resulting film is about 2 mils thick and has a non-mottled appearance, good gloss, excellent hardness, and is resistant to blistering at high humidity, has excellent resistance to water spotting, good chip resistance, good gasoline resistance and excellent resistance toward deterioration by weathering.

EXAMPLE 2

A coating composition is prepared by first forming the following acrylic polymer solution:

|  | Parts By Weight |
|---|---|
| Portion 1 |  |
| Methyl methacrylate monomer | 18.210 |
| Butyl acrylate monomer | 21.050 |
| 2-Hydroxyethyl acrylate monomer | 1.900 |
| Acrylic acid monomer | 1.810 |
| Isopropanol | 6.550 |
| Ethylene glycol monobutyl ether | 8.730 |
| Lauryl mercaptan | 0.310 |
| Portion 2 |  |
| Benzoyl peroxide | 0.716 |
| Ethylene glycol monobutyl ether | 5.880 |
| Methylethyl ketone | 1.600 |
| Portion 3 |  |
| Methyl methacrylate monomer | 26.800 |
| Butyl acrylate monomer | 13.030 |
| 2-Hydroxyethyl acrylate monomer | 2.860 |
| Acrylic acid monomer | 3.180 |
| Benzoyl peroxide | 1.150 |
| Isopropanol | 3.800 |
| Ethylene glycol monobutyl ether | 12.400 |
| Portion 4 |  |
| Methyl methacrylate monomer | 26.800 |
| Butyl acrylate monomer | 13.030 |
| 2-Hydroxyethyl acrylate monomer | 2.850 |
| Acrylic acid monomer | 3.170 |
| Benzoyl peroxide | 1.150 |
| Isopropanol | 3.800 |
| Ethylene glycol monobutyl ether | 12.400 |
| Portion 5 |  |
| Methyl methacrylate monomer | 10.210 |
| Butyl acrylate monomer | 4.880 |
| 2-Hydroxyethyl acrylate monomer | 1.160 |
| Acrylic acid monomer | 1.200 |
| Benzoyl peroxide | 0.474 |
| Isopropanol | 1.550 |
| Ethylene glycol monobutyl ether | 5.080 |
| Portion 6 |  |
| Diethylethanolamine | 10.500 |
| Demineralized water | 128.000 |

-Continued

Portion 7
Demineralized water 209.60
Total 566.730

Portion 1 is charged into a reaction vessel equipped with a stirrer, a heating mantel and a reflux condenser and the ingredients are heated to the reflux temperature. Portion 2 is premixed and then added to the reaction mixture and then Portion 3 is added at a uniform rate over a 20 minute period while maintaining the reaction mixture at a reflux temperature. Portion 4 is premixed and then about 34% of Portion 4 is added at a continuous rate to the reaction mixture over a 20-minute period. Then the remainder of Portion 4 is added at a continuous rate over the next 60-minute period while maintaining the reaction mixture at its reflux temperature. Portion 5 is premixed and then added at a uniform rate over a 100-minute period keeping the reaction mixture at its reflux temperature and then the reaction mixture is held at its reflux temperature for an additional ½ hour. Portion 6 is then added to the reaction mixture and then Portion 7 is added and the mixture is cooled and filtered to remove coagulum.

The resulting polymer dispersion has a polymer solids content of about 26% by weight and the polymer has a a relative viscosity of about 1.15 measured at 25°C. in dimethyl formamide solvent at about 0.5% polymer solids. The polymer has an acid number of about 46 to 47 and a carboxyl to hydroxyl ratio of 1 to 0.62. The polymer has the following composition: methyl methacrylate/ butyl acrylate/2-hydroxyethyl acrylate/ acrylic acid in a weight ratio of about 54/34/6/6 and a uniformity factor of about 75–85%.

A paint composition is then prepared by blending together the following ingredients:

| | Parts By Weight |
|---|---|
| Portion 1 | |
| Mill base (described in Example 1) | 6.35 |
| "Monastral" Blue mill base (prepared in Example 1) | 0.20 |
| "Monastral" Violet mill base (prepared in Example 1) | 0.70 |
| Phthalocyanine green-yellow mill base (prepared in Example 1) | 0.45 |
| Aluminum Flake mill base (prepared in Example 1) | 11.05 |
| Portion 2 | |
| Hexa(methoxymethyl) melamine | 20.40 |
| Portion 3 | |
| Acrylic polymer dispersion (prepared above) | 272.40 |
| Portion 4 | |
| Deionized water | 18.00 |
| Portion 5 | |
| Butyl acrylate/acrylic acid copolymer solution (described in Example 1) | 3.30 |
| Anti-cratering solution (10% silicone solution) | 3.35 |
| Deionized water | 31.00 |
| Total | 367.20 |

Portion 1 is charged into a mixing vessel and thoroughly blended together and then Portion 2 is added and blended and then Portion 3 is added and the constituents are thoroughly blended together. Portion 4 is added and blended with the mixture and then Portion 5 is added and thoroughly blended with the mixture. The resulting paint composition has a 28% solids content and a spray viscosity of 31 seconds using a No. 2 Zahn Cup.

The paint is sprayed onto a steel panel primed with 1.5 mil thick iron oxide pigment alkyd resin primer as in Example 1. The coating is baked as in Example 1 providing a film about 2 mils thick which has a nonmottled appearance, good gloss, good adhesion to the substrate, good chip resistance, good gasoline resistance and resistance to deterioration by weathering.

The invention claimed is:

1. In an aqueous thermosetting acrylic enamel coating composition comprising 10–60% by weight of film-forming constituents and correspondingly 89.75–39% by weight of water and up to 20% by weight of a solvent for the film-forming constituents and 0.25–1% by weight of a uniformly dispersed aluminum flake pigment; the film-forming constituents consist essentially of 1. 59.5–85% by weight, based on the weight of the film-forming constituents, of an acrylic polymer of which 30–50% by weight of the polymer is dispersed and the remainder dissolved in the composition, the dispersed polymer having a particle size of 0.01–0.10 microns, said polymer having a uniformity factor of at least 75% carboxyl to hydroxyl ratio of 1:0.2 to 1:1.8, an acid number of about 35–150, a molecular weight of 5,000–80,000 and consists essentially of
   a. 20–60% by weight, based on the weight of the acrylic polymer, of a hard constituent which is either methyl methacrylate, or a blend of methyl methacrylate and styrene wherein the styrene comprises up to 40% by weight of the acrylic polymer;
   b. 20–40% by weight, based on the weight of the acrylic polymer, of a soft acrylic constituent that is either an alkyl acrylate having 2–12 carbon atoms in the alkyl group, an alkyl methacrylate having 4–12 carbon atoms in the alkyl group, or a mixture of the above acrylate and methacrylate;
   c. 4–20% by weight, based on the weight of the acrylic polymer, of a hydroxy-containing constituent which is either a hydroxyalkyl methacrylate or a hydroxyalkyl acrylate or a mixture thereof in which the alkyl groups have 2–4 carbon atoms,
   d. 4–20% by weight, based on the weight of the acrylic polymer, of $\alpha,\beta$-unsaturated carboxylic acid;
2. 10–40% by weight, based on the weight of the film-forming constituent, of a water dispersible alkylated melamine formaldehyde resin having 1–4 carbon atoms in the alkyl groups; and the composition is at least partially neutralized with a water-soluble amine and has a pH of about 6–9;

the improvement comprising 0.5–5% by weight, based on the weight of the film-forming constituents, of an acrylic copolymer having a weight average molecular weight of about 2,500 to 45,000 and consisting essentially of 75–95% by weight, based on the weight of the acrylic copolymer of an alkyl acrylate having 1–8 carbon atoms in the alkyl group and 5–25% by weight, based on the weight of the acrylic copolymer, of acrylic acid or methacrylic acid.

2. The coating composition of claim 1 in which the acrylic copolymer consists essentially of
75–95% by weight of butyl acrylate and
5–25% by weight of acrylic acid.

3. The coating composition of claim 2 containing 0.1–40% by weight pigment.

4. The coating composition of claim 3 in which the acrylic polymer consists essentially of 50–60% by weight of methyl methacrylate, 30–40% by weight of butyl acrylate, 5–10% by weight of hydroxy ethyl acrylate and 4–12% by weight of acrylic acid and the polymer has an acid number of about 35–100 and a carboxyl to hydroxyl ratio of 1:0.3 to 1:1.5.

5. The coating composition of claim 3 in which the acrylic polymer consists essentially of 28–32% by weight of styrene, 22–26% by weight of methyl methacrylate, 30–35% by weight of butyl acrylate, 7–9% by weight of hydroxy ethyl acrylate, 4–6% by weight of acrylic acid, and has an acid number of 30–50, a carboxyl to hydroxyl ratio of 1:0.4 to 1:1.5.

6. The coating composition of claim 3 in which the acrylic polymer consists essentially of 54% methyl methacrylate, 34% butyl acrylate, 6% 2-hydroxyethyl acrylate and 6% acrylic acid and has an acid number of about 45–50 and a carboxyl to hydroxyl ratio of about 1:0.6.

7. The aqueous thermosetting acrylic enamel coating composition of claim 1; wherein the film-forming constituents consist essentially of
  1. 59.5–85% by weight, based on the weight of the film-forming constituents, of an acrylic polymer having a uniformity factor of 80–95% and consists essentially of
     a. 50–60% by weight, based on the weight of the acrylic polymer, of methyl methacrylate,
     b. 30–40% by weight, based on the weight of the acrylic polymer, of butyl acrylate;
     c. 5–10% by weight, based on the weight of the acrylic polymer, of hydroxyethyl acrylate;
     d. 4–12% by weight, based on the weight of the acrylic polymer, of acrylic acid or methacrylic acid;
     wherein 30–50% by weight of the acrylic polymer is dispersed and has a particle size of 0.01–0.10 microns and the remaining 50–70% is soluble and dissolved and the polymer has a carboxyl to hydroxyl ratio of 1:0.3 to 1:1.5 and an acid number of about 35–80 and a weight average molecular weight of 10,000 – 50,000, and
  2. 10–40% by weight, based on the weight of the film-forming constituent, of a hexa(methoxymethyl) melamine; and
  the composition is at least partially neutralized with a water-soluble amine and has a pH of about 7.1 – 7.5; the improvement in use therewith comprises 0.5–5% by weight, based on the weight of the film-forming constituents of an acrylic copolymer consisting essentially of
     85% by weight of butyl acrylate and 15% by weight of acrylic acid having a weight average molecular weight of about 2,500 to 12,000.

* * * * *